United States Patent [19]
Kataoka

[11] Patent Number: 5,831,744
[45] Date of Patent: Nov. 3, 1998

[54] IMAGE FORMING APPARATUS THAT WARNS OF AN ABNORMALITY IN INPUT IMAGE INFORMATION

[75] Inventor: Tatsuhito Kataoka, Tokyo, Japan

[73] Assignee: Canon Kabushiki Kaisha, Tokyo, Japan

[21] Appl. No.: 682,300

[22] Filed: Jul. 17, 1996

[30] Foreign Application Priority Data

Jul. 20, 1995 [JP] Japan ................................. 7-184495

[51] Int. Cl.[6] .......................... H04N 1/00; G03G 15/00
[52] U.S. Cl. .................. 358/296; 358/300; 358/401; 399/45; 399/66; 399/67; 400/56
[58] Field of Search ................... 358/296, 300, 358/401, 406, 434, 437, 449, 498, 501, 504; 399/9, 16, 18, 23, 33, 45, 67–69, 81, 310, 316, 320–322, 328, 335, 339, 381, 389, 396, 400, 66, 297, 298; 400/56

[56] References Cited

U.S. PATENT DOCUMENTS

| 5,156,464 | 10/1992 | Sakai | 400/56 |
|---|---|---|---|
| 5,306,381 | 4/1994 | Nakazawa et al. | 399/69 X |
| 5,331,386 | 7/1994 | Mizubata et al. | 399/389 X |
| 5,474,392 | 12/1995 | Matsuoka | 400/56 |
| 5,486,903 | 1/1996 | Kanno et al. | 399/45 |
| 5,512,992 | 4/1996 | Kim et al. | 399/69 |
| 5,519,478 | 5/1996 | Malachowski | 399/68 |
| 5,557,428 | 9/1996 | Watanabe | 358/501 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An image forming apparatus has an image forming unit for forming an image on a recording member, an inputting device for manually inputting information regarding the recording member, a control for controlling image forming conditions on the basis of the input value by the inputting device, a detector for detecting the thickness of the recording member, and a warning unit for warning of the abnormality of the input to the inputting device on the basis of the input value by the inputting device and the detection value of the detector.

15 Claims, 8 Drawing Sheets

| FIG. 9A |
|---|
| FIG. 9B |

IMAGE FORMING APPARATUS THAT WARNS OF AN ABNORMALITY IN INPUT IMAGE INFORMATION

BACKGROUND OF THE INVENTION

1. Field of the Invention

This invention relates to an image forming apparatus such as a copying apparatus or a printer.

2. Related Background Art

In image forming apparatuses such as copying apparatuses and printers, recommended sheets are specified for each apparatus, but actually, recording sheets differing in basis weight and thickness are used.

When the thicknesses of the recording sheets differ like this, proper image forming conditions also change.

For example, in a fixing device, when the recording sheet is thick, the quantity of heat taken away by the sheet is great and low temperature offset is liable to occur, and when conversely the recording sheet is thin, high temperature offset is liable to occur.

In a full color apparatus wherein four colors of toners are laminated, a proper range of latitude is narrow and it is difficult to cope with various sheet thicknesses.

Therefore, it would occur to mind to detect the thickness of a recording sheet and control image forming conditions, but sheets differing in density differ in heat capacity even though they are equal in thickness and therefore, it is not achieved to use optimum image forming conditions for respective ones of various recording sheets.

It would also come to mind for a user to input recording sheet information to the apparatus and control the image forming conditions.

This technique is wide in the range of kinds of paper which can be coped with, but since the inputting relies on the user, the problem of wrong inputting is unavoidable, and if the degree of the wrong inputting is great, it may damage the apparatus.

SUMMARY OF THE INVENTION

It is an object of the present invention to provide an image forming apparatus which can effect image formation on various recording materials under proper conditions.

It is another object of the present invention to provide an image forming apparatus to which an operator can input recording material information.

It is still another object of the present invention to provide an image forming apparatus having:

image forming means for forming an image on a recording member;

inputting means for manually inputting information regarding the recording member;

control means for controlling image forming conditions on the basis of the input value by the inputting means;

detecting means for detecting the thickness of the recording member; and warning means for warning of the abnormality of the input to the inputting means on the basis of the input value by the inputting means and the detection value of the detecting means.

It is yet still another object of the present invention to provide an image forming apparatus having:

image forming means for forming an image on a recording member;

inputting means for manually inputting information regarding the recording member;

control means for controlling image forming conditions on the basis of the input value by the inputting means;

detecting means for detecting the thickness of the recording member; and stop means for stopping image formation on the basis of the input value by the inputting means and the detection value of the detecting means.

Further objects of the present invention will become apparent from the following detailed description.

DESCRIPTION OF THE PREFERRED EMBODIMENTS

Figure 1:
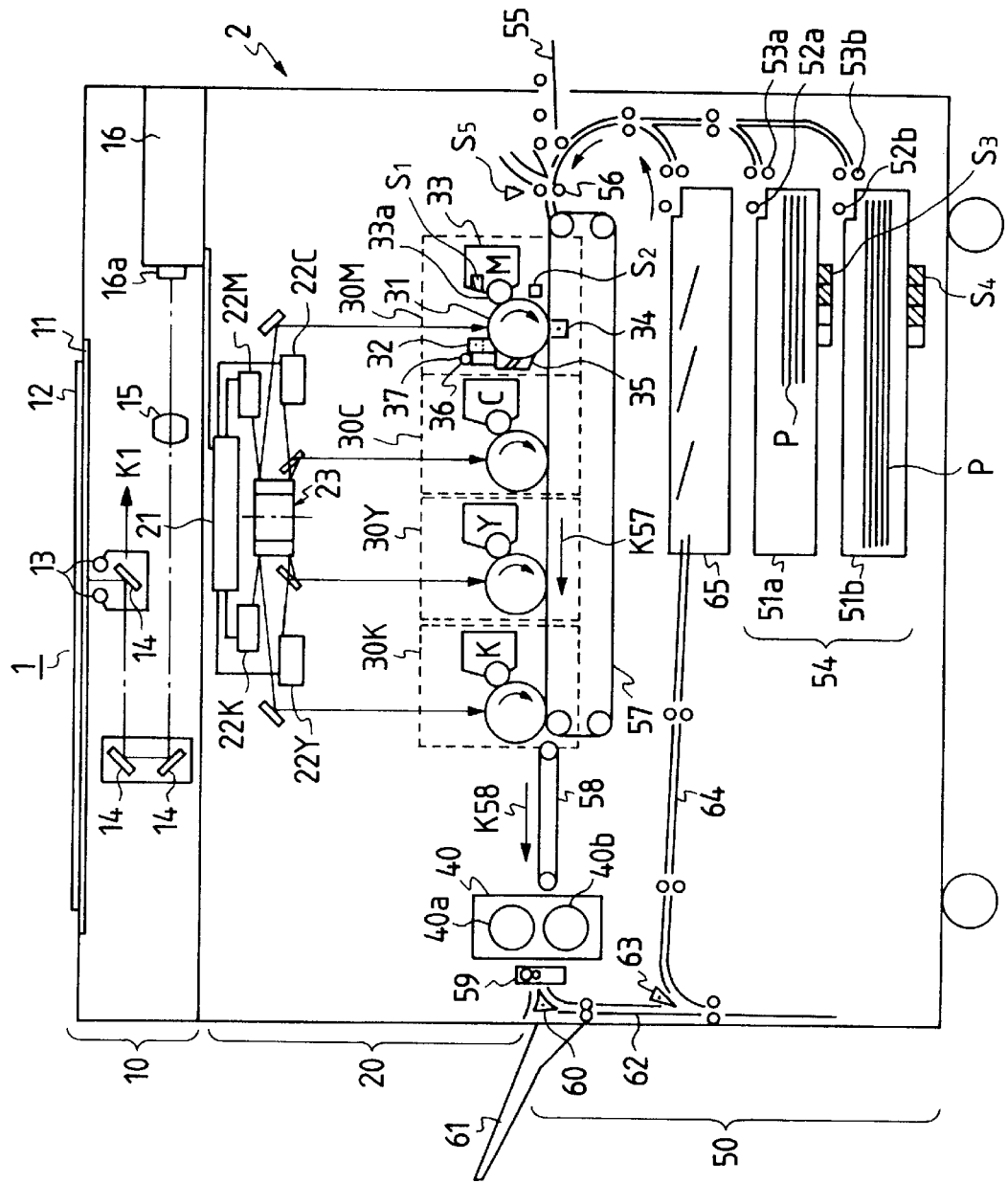
FIG. 1 is a longitudinal cross-sectional view schematically showing the construction of an image forming apparatus according to the present invention.

FIG. 1 schematically shows the construction of a digital color image forming apparatus 1 as an embodiment of an image forming apparatus according to the present invention.

The construction and operation of this apparatus will first be described with reference to FIG. 1.

The image forming apparatus 1 of FIG. 1 is provided with a reader unit 10 in the upper portion of an apparatus body 2, a printing unit 20 in the intermediate portion of the apparatus body 2, and a supplying and conveying unit 50 for a transfer member P in the lower portion of the apparatus body 2.

Figure 2:
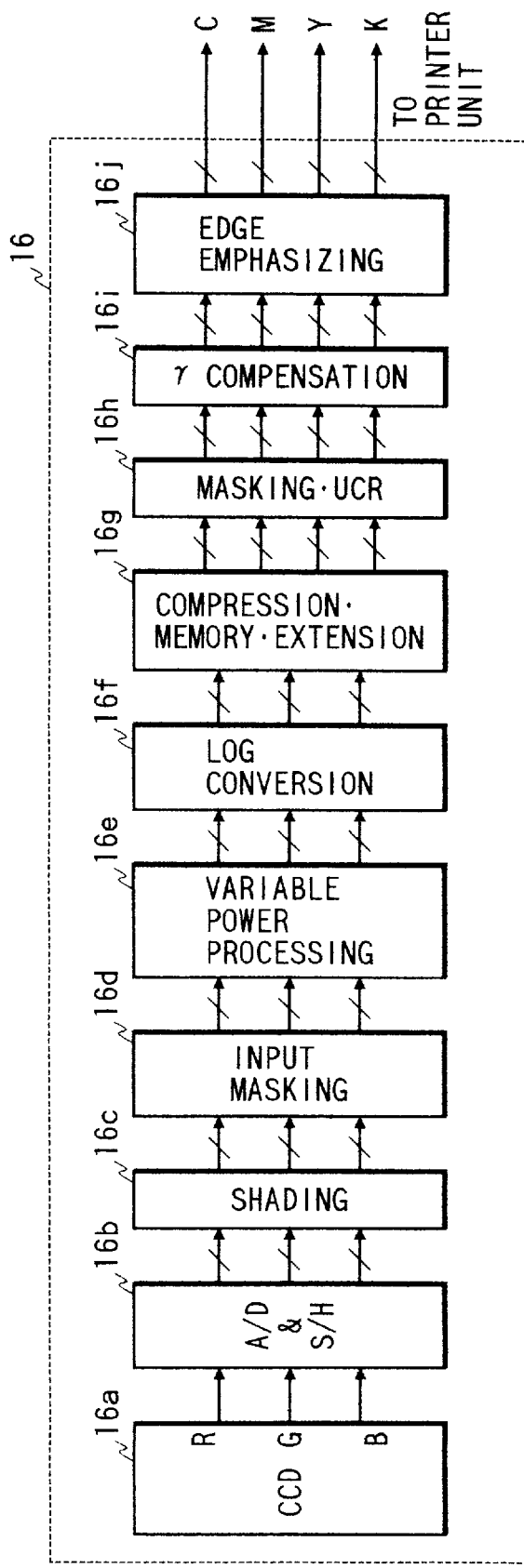
FIG. 2 is a block diagram showing the details of an image processing unit.

The reader unit 10 is comprised chiefly of an original supporting table 11 on which an original is placed, an original pressing plate 12 for pressing the placed original from above it, a light source 13 for irradiating the image surface of the original, a plurality of mirrors 14 and a lens 15 for directing the reflected light from the image surface, a CCD 16a for effecting the photoelectric conversion of the reflected light, and an image processing unit 16 for effecting various image processings. Further, the image processing unit 16, as shown in FIG. 2, has the CCD 16a, an A/D & S/H portion 16b, a shading correction portion 16c, an input masking portion 16d, a variable power processing portion 16e, a LOG conversion portion 16f, a compression and extension portion 16g, a masking and UCR portion 16h, a γ compensation portion 16i and an edge emphasizing portion 16j.

The operation of the reader unit 10 of the above-described construction is as follows.

An original is placed on the original supporting table 11 in such a manner that the image surface thereof faces downward, and the original is pressed from above it by the original pressing plate 12. The light source 13 is moved in the direction of arrow-K1 while applying light, and scans the image surface of the original. The reflected light image from the image surface is formed on the (C) 16a provided with filters of three colors, R, G and B, through the intermediary of the plurality of mirrors 14 and the lens 15, and is photoelectrically converted there into signals of R, G and B colors. The image signals which are now electrical signals are processed in the image processing unit 16 in the following manner in accordance with a flow shown in FIG. 2. The signals from the CCD 16a are converted into digital data in the A/D & S/H portion 16b, and further the returned digital data is corrected by the shading correction portion 16c and the input masking portion 16d. Also, during the variable power operation, it is subjected to a variable power process by the variable power processing portion 16e. Subsequently, the data of RGB is converted into data of CMY by the LOG conversion portion 16f, and is inputted to the compression and extension portion 16g for effecting the compression, member and extension of the image data. The stored image data is read out in synchronism with the respective colors of the printing unit 20 which will be described later, and is masking-processed by the masking and UCR portion 16h, whereafter output image data of YMCK is made by the γ compensation portion 16i and the edge emphasizing portion 16j, and is sent to the subsequent printing unit 20.

The printing unit 20, as shown in FIG. 1, is comprised chiefly of an image control portion 21 for taking the synchronism of each color, four laser elements, i.e., laser elements 22M, 22C, 22Y and 22K for respective colors, magenta, cyan, yellow and black, a polygon scanner 23 for scanning the surface of a photosensitive drum which will be described later by a laser beam, four image forming portions, i.e., image forming portions 30M, 30C, 30Y and 30K for respective colors, magenta, cyan, yellow and black disposed in succession from the upstream side toward the downstream side with respect to the direction of conveyance of the transfer member P (from the right side to the left side as viewed in FIG. 1), and a fixing device 40 disposed further downstream of the most downstream side image forming portion 30K. Also, the most upstream side image forming portion 30M for magenta is provided with a photosensitive drum 31 supported for rotation in the direction of arrow, and a primary charger 32 for charging the surface of the photosensitive drum 31, a developing device 33 for developing an electrostatic latent image on the photosensitive drum 31, a transfer charger 34 for transferring the toner image on the photosensitive drum 31 to the transfer member P, a cleaner 35 for removing any residual toner on the photosensitive drum 31, an auxiliary charger 36 for removing charges, and a pre-exposure lamp 37 for removing any residual charges which are substantially in succession around the photosensitive drum 31 along the direction of rotation thereof. There are further disposed a developer density sensor $S_1$ for detecting the density of a developer by the quantity of reflected light from the developer on the developing roller 33a of the developing device 33, and a developing density sensor $S_2$ for detecting the quantity of reflected light from the toner image formed on the photosensitive drum 31.

The image forming portions 30C, 30Y and 30K for the other colors are similar in construction to the above-described image forming portions 30M for magenta, therefore, its explanation will be omitted.

The printing unit 20 of the above-described construction forms a toner image on the transfer member P in the following manner on the basis of the output image data delivered from the aforedescribed reader unit 10.

In the magenta image forming portion 30M, the surface of the photosensitive drum 31 is uniformly charged to predetermined potential by the primary charger 32. Synchronism with the other colors is taken by the image control portion 21 on the basis of the output image data and the laser element 22M for magenta is driven, and the surface of the photosensitive drum 31 is scanned. Thereby, an electrostatic latent image corresponding to magenta in the original image is formed on the surface of the photosensitive drum 31. A magenta toner is attached to the electrostatic latent image by the developing roller 33a to which a developing bias has been applied, whereby the latent image is developed as a toner image. This toner image is transferred to the surface of the transfer member P conveyed by a transfer belt which will be described later, by the discharging of the transfer charger 34 from the inside of the transfer belt. After the transfer of the toner image, the photosensitive drum 31 has any residual toner on its surface removed by the cleaner 35, and is further subjected to the removal of charges by the auxiliary charger 36, and has any residual charges thereon removed by the pre-exposure lamp 37 and is used for the next image formation which begins with the charging by the primary charger 32.

In the same manner as in this magenta image forming portions 30M, in the downstream cyan, yellow and black image forming portions 30C, 30Y and 30K, toner images of the respective colors are formed on the surfaces of respective photosensitive drums. The transfer member P having the magenta, toner image thus transferred to its surface is conveyed to the downstream cyan, yellow and black image forming portions 30C, 30Y and 30K in succession by the transfer belt, and the toner images of the respective colors are transferred to the surface of the transfer member P one after another and thus, the toner images of four colors are superposed on the surface of the transfer member P. The transfer member P having the toner images of four colors thus transferred to its surface is conveyed to the fixing device 40 by a pre-fixation belt which will be described later, and is subjected there to the heating and pressing by a fixating roller 40a and a pressing roller 40b, whereby the toner images on the surface of the transfer member P are fixed. After the fixion, the transfer member P is intactly discharged out of the apparatus body 2 when image formation is not effected on its back, and on the other hand, when images are to be formed on the back, the transfer member P is again supplied to the image forming portion 30M, etc. by a supplying and conveying portion 50 which will now be described, and after toner images have been formed on the back of the transfer member P, the transfer member P is discharged out of the apparatus body 2.

The supplying and conveying portion 50 for effecting the supply and conveyance of the transfer member P has a conveyance path for the transfer member P, and is provided with a sheet feeding device 54 having paper supply cassettes 51a, 51b, paper feed rollers 52a, 52b, conveying rollers 53a, 53b, etc. on the upstream side with respect to the direction of conveyance of the transfer member P. To the undersides of the paper supply cassettes 51a and 51b, there are attached sheet detection units $S_3$ and $S_4$ for detecting the sizes of transfer members P contained in these paper supply cassettes 51a and 51b when these cassettes are mounted in the apparatus body 2. The sheet size detection units $S_3$ and $S_4$ are provided with engagement portions (not shown) disposed on the paper supply cassettes 51a, 51b side, and size detection switches (not shown) on the apparatus body 2 side, and when the paper supply cassettes 51a and 51b are mounted, the engagement portions actuate the size detection switch corresponding to the size of the transfer member P, whereby a code signal corresponding to the size is outputted as size information to the apparatus body 2. From this multisheet feeding device 55, various transfer members P differing in nature such as the quality of material and size can be supplied to the image forming portion 30M, etc. Information about the transfer member P supplied from there, for example, the quality of material, size, thickness, etc. are inputted from an operating portion (not shown) by a user, or the thickness is automatically detected by a paper thickness detecting unit as will be described later.

A little upstream of the image forming portion 30M, there is disposed a resist roller 56 for once stopping the transfer member P conveyed thereto and conveying it to the image forming portion 30M, etc. in synchronism therewith. The resist roller 56 is provided with a pair of upper roller 56a (see FIG. 7) and lower roller 56b, and conveys the transfer member P in such a manner as to sandwich the transfer member P by and between these rollers 56a and 56b. At this time, by the utilization of the fact that the upper roller 56a moves in conformity with the thickness of the transfer member P and the position of the upper roller 56a relative to the lower roller 56b changes, this resist roller 56 is used also as a paper thickness detecting roller. This resist roller 56, a sensor, etc. which will be described later together constitutes a paper thickness detecting unit (thickness detecting means) $S_5$. The detailed construction and operation of the paper thickness detecting unit $S_5$ will be described later.

Downstream of the resist roller 56, there is disposed a transfer belt 57 moving round in the direction of arrow K57 in such a manner to contact from below with the photosensitive drums of the aforedescribed image forming portions 30M, 30C, 30Y and 30K for respective colors. The transfer belt 57 is designed to carry the transfer member P on the surface thereof and convey it to the image forming portions 30M, 30C, 30Y and 30K.

Downstream of and between the transfer belt and the fixating device 40, there is disposed a pre-fixation belt 58 movable round in the direction of arrow K58. Also, immediately downstream of the fixating device 40, there is a pressing mechanism unit (curved pressing device) 59 (which will be described later) capable of effecting the pressing for the rigidification of the transfer member P after fixation with a plurality of changeable-over pressure forces. Downstream of the pressing mechanism unit 59, there are disposed a discharge flapper 60 for selecting the discharge or resupply of the transfer member P, and a paper discharge tray 61, and below the discharge flapper 60, there are disposed a reverse conveyance path 62 and a reversing flapper 63, and further downstream, there are disposed a paper resupply conveyance path 64 and a paper resupplying device 65.

The supplying and conveying device 50 of the above-described construction operates as follows. The transfer member P supplied from the sheet feeding device 54 or the multisheet feeding device 55 is temporarily stopped by the resist roller 56, whereafter it is conveyed by the resist roller 56 in such a manner as to be synchronized with the toner images of respective colors formed on the photosensitive drums of the aforedescribed image forming portions 30M, 30C, 30Y and 30K, and is further conveyed by the transfer belt 57. At this time, the paper thickness is detected by the paper thickness detecting unit $S_5$ having the resist roller 56. The transfer member P carried on the transfer belt 57 has a magenta toner image transferred to its surface by the transfer charger 34 when it passes the magenta image forming portion 30M. Thereafter, the transfer member P has toner images of respective colors successively transferred thereto in a similar manner when it passes the cyan, yellow and black image forming portions 30C, 30Y and 30K. The transfer member P to which the toner images of the four colors have thus been transferred is carried to the fixating device 40 by the pre-fixation belt 58, and is heated and pressed there, whereby the toner images on the surface thereof are fixated. After the fixation of the toner images, the transfer member P is rigidified by the pressing mechanism unit 59. In the case of one-surface image formation, the discharge flapper 60 is set on the discharge side and the transfer member P is discharged onto the paper discharge tray 61. On the other hand, in the case of both-surface image formation, the discharge flapper 60 is again set on the paper resupply side, whereby the transfer member P is directed to the reverse conveyance path 62 and is conveyed downwardly until the trailing end thereof passes the reversing flapper 63. Thereafter, the reversing flapper 63 is changed over and the transfer member P is conveyed upwardly, whereupon the transfer member P is directed to the paper resupply conveyance path 64 by the reversing flapper 63 and is contained into the paper resupply device 65. Thereby, the transfer member P is reversed. The transfer member P is resupplied from there to the image forming portion 30M, etc., and in the same manner as when image formation has been effected on the surface thereof, image formation is effected on the back thereof, whereafter the transfer member P is discharged onto the paper discharge tray 61.

The foregoing is the description of the construction and operation of the entire image forming apparatus.

Figure 3:
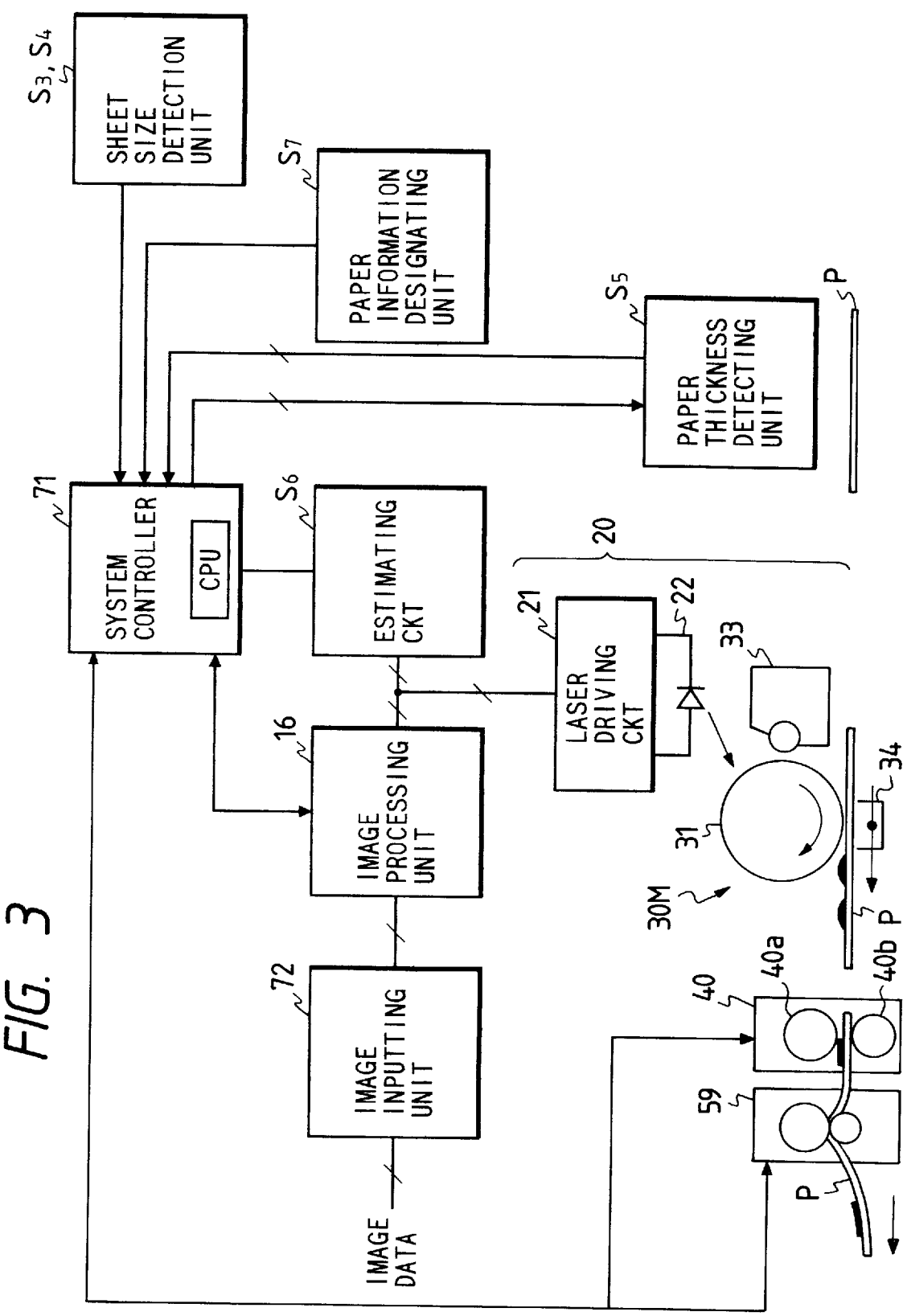
FIG. 3 shows the manner in which image forming conditions are changed depending on the nature of a transfer member used for image formation.

FIG. 3 shows a block diagram of the above-described image forming apparatus. This block diagram is a block diagram for effecting optimum image formation conforming to the transfer member P. A system controller 71 effects the various kinds of control of the image forming apparatus, and generically effects the control by a CPU therein. In FIG. 3, the reference numeral 72 designates an image inputting unit constituting a portion of the reader unit 10, the reference numeral 16 denotes an image processing unit, the reference numeral 21 designates a laser driving circuit (image control unit) for modulating and driving a semiconductor laser on the basis of image data, and the reference numeral 22 denotes a semiconductor laser (laser element) driven by the laser driving circuit 21. Also, the reference numerals 31, 33 and 34 designate members constituting the aforedescribed magenta image forming portion 30M, and more specifically, the reference numeral 31 denotes a photosensitive drum on which an electrostatic latent image is formed by the output light of the semiconductor laser 22, the reference numeral 33 designates a developing device for effecting development conforming to the latent image on the photosensitive drum 31, and the reference numeral 34 denotes a transfer charger for transferring the toner image on the photosensitive drum 31 to the transfer member P. Further, the reference numeral 40 designates a fixating device for heating and pressing the toner image on the transfer member P to thereby fixate it, and the reference numeral 59 denotes a pressing mechanism unit for rigidifying the transfer member P after fixation. The reference character $S_6$ designates a density distribution estimating circuit (hereinafter suitably referred to as the "estimating circuit" and described later) for estimating the image density distribution on the basis of image data outputted from the image processing unit 16. The reference character $S_7$ denotes a paper thickness designating unit (thickness designating means) for the user to manually input information about the thickness of the transfer member P used for image formation.

The operation for effecting optimum image formation in the image forming apparatus of the aforedescribed construction will now be described with reference to the block diagram of FIG. 3. The image information of the original is inputted as an electrical signal through the image inputting unit 72, is subjected to image processings necessary for image formation such as A/D conversion, shading compensation, LOG conversion, UCR processing and γ compensation in the image processing unit 16, and is outputted as output image data. On the basis of this output image data, the laser driving circuit 21 is driven to thereby modulate and drive the semiconductor laser 22. The output light of the semiconductor laser 22 is scan-exposed on the charged photosensitive drum 31, whereby a charge distribution, i.e., an electrostatic latent image, corresponding to the image data is formed on the surface of the photosensitive drum 31. This electrostatic latent image has a toner attached thereto by the developing device 33 and is developed as a magenta toner image.

This magenta toner image is transferred to the surface of the transfer member P conveyed by the aforedescribed supplying and conveying portion 50. This transfer member P is one of which the size has been detected in advance by the sheet size detection unit $S_3$ and the thickness has been detected by the paper thickness detecting unit $S_5$ before the transfer of the toner image. Also, by the transfer of the toner image, the toner in the developing device 33 shifts onto the transfer member P, and on the transfer member P, the toner image is recognized as a distribution of the toner. The estimating circuit $S_6$ estimates the distribution of the toner, i.e., the image density distribution, on the transfer member P on the basis of the same image data as that used for image formation. Further, toner images of respective colors are successively transferred onto the transfer member P by the downstream cyan, yellow and black image forming portions 30C, 30Y and 30K. During these transfers, the estimation of the image density distributions of the respective colors is likewise effected by the estimating circuit $S_6$.

The toner images of the four colors on the transfer member P are heated and pressed by the fixating device 40 and are fixated thereby. There is an optimum fixating temperature in heating and fixating these toners, and it is realized by changing fixating conditions on the basis of the size of the transfer member P detected by the sheet size detection units $S_3$, $S_4$, the thickness of the transfer member P detected by the paper thickness detecting unit $S_5$, and the image density distribution estimated by the estimating circuit $S_6$.

For example, when the transfer member P is to be heated while being sandwiched between and conveyed by the fixating roller 40a and pressing roller 40b of the fixating device 40, the number of revolutions of the fixating roller 40a is controlled in conformity with the thickness of the transfer member P and the conveyance speed (fixation speed) of the transfer member P is varied to thereby realize optimum fixating conditions. That is, when the thickness of the transfer member P is great, the fixation speed is made low, and when the thickness of the transfer member P is small, the fixation speed is made high so that a quantity of heat sufficient to melt the toner images may be given to the toner images.

Also, the transfer bias applied to the transfer charger 34 when the toner images are transferred from the photosensitive drum 31 onto the transfer member P is determined on the basis of information about the size and thickness of the transfer member P.

Further, the amount of pressure of the pressing mechanism unit 59 for rigidifying the transfer member P after heating and fixation is changed over in conformity with the size and thickness of the transfer member P, whereby optimum press control for decurling becomes possible.

That is, in the block diagram shown in FIG. 3, design is made such that on the basis of the outputs of the sheet size detection units $S_3$, $S_4$, the paper thickness detecting unit $S_5$, the estimating circuit $S_6$ and the paper information designating unit $S_7$, the transfer charger 34, the fixating device 40, the pressing mechanism unit 59, etc. are suitably controlled and optimum image formation is effected.

The sheet size detection units $S_3$ and $S_4$ have been previously described, and the estimating circuit $S_6$, the paper thickness detecting unit $S_5$, the pressing mechanism unit 59, etc. will now be described in detail.

Figure 4:
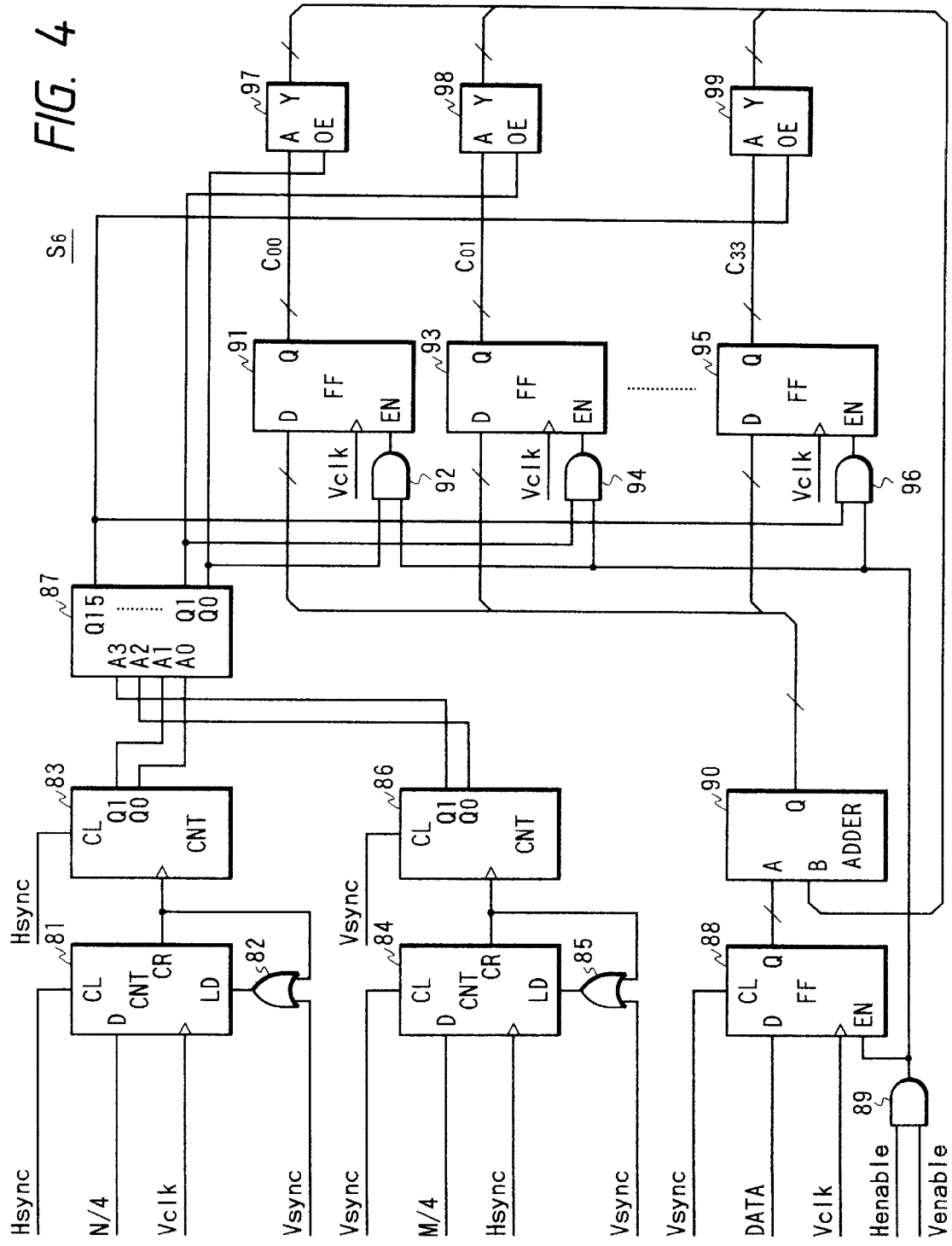
FIG. 4 is a block diagram showing the details of an estimating circuit.
Figure 5:
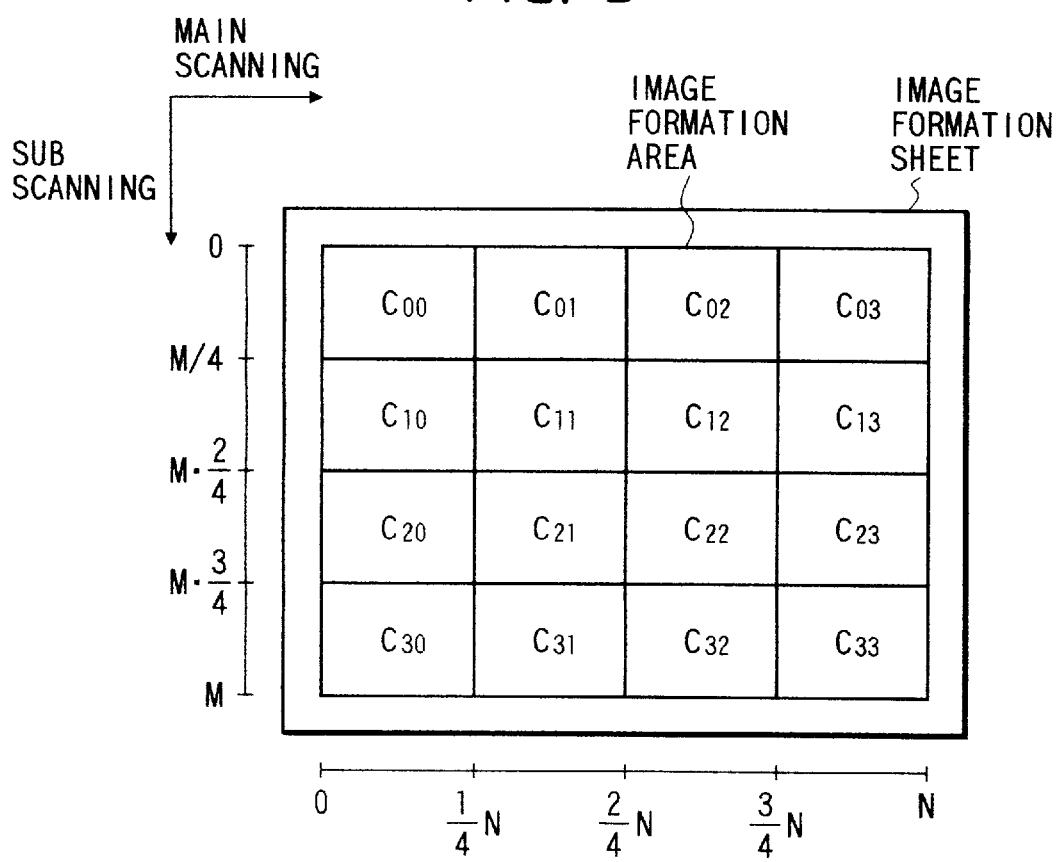
FIG. 5 shows the calculation area of the estimating circuit.

FIG. 4 shows a detailed circuit diagram of the estimating circuit $S_6$. Here, the quantities of developers (toners) used are schematically considered to be proportional to the integrated value of image data and therefore, a circuit in which an image is divided into a plurality of areas and the integration of the image data value in each of these areas is effected is supposed as to estimating circuit $S_6$, and in the form of the present embodiment, description will be made with respect to an example for calculating $C_{00}$–$C_{33}$ shown in FIG. 5 resulting from dividing an image into 4×4, i.e., 16 areas. Here, $C_{mn}$ is the image density value of each area.

In FIG. 4, Data is image data, and in the form of the present embodiment, it is a signal of 8 bits. $V_{clk}$ is the synchronous signal of the image data, and $V_{sync}$ is a such scanning synchronous signal indicative of one image section start. $H_{enable}$ is a main scanning image effective section signal, and $V_{enable}$ is a sub scanning image effective section signal. On the basis of the size of the transfer member P detected by the sheet size detection units $S_3$ and $S_4$, the system controller 71 derives the number of pixels N of main scanning and the number of pixels M of sub scanning for effecting image formation, and effects the calculation of M/4 and N/4 corresponding to one area of the density distribution. The reference numeral 81 designates a counter for counting the areas of main scanning, the reference numerals 82 and 85 denote OR gates, the reference numeral 83 designates an up counter for indicating numerical values indicative of the areas of main scanning, the reference numeral 84 denotes a counter for counting the areas of sub scanning, the reference numeral 86 designates an up counter for indicating numerical values indicative of the areas of sub scanning, the reference numeral 87 denotes an encoder for encoding numerical values indicative of the areas of the up counters 83 and 86, the reference numeral 88 designates a flip-flop to which image data is inputted, the reference numeral 89 denotes an AND gate for producing an enable signal, the reference numeral 90 designates an adder for adding the image data and the data integrated value of a selected area, the reference numerals 91, 93 and 95 denote flip-flops for storing the image data addition values of respective areas therein, the reference numerals 92, 94 and 96 designate AND gates for producing the enable signals of respective areas, and the reference numerals 97, 98 and 99 denote buffers with output enable for outputting the image data integrated value of each area to the adder.

Figure 6:
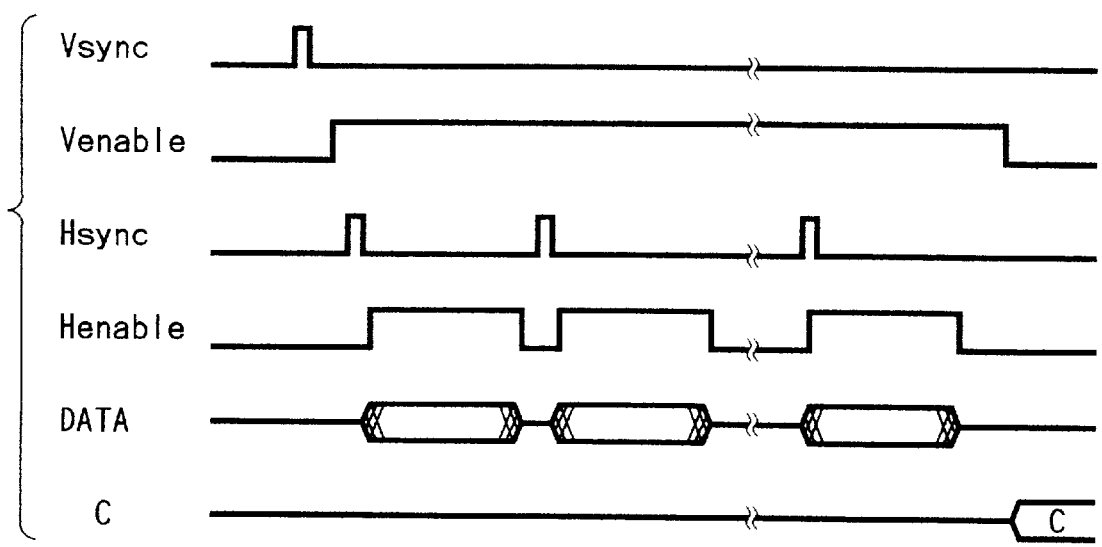
FIG. 6 is a timing chart of control signals for driving the estimating circuit.

The counting of the areas of main scanning is realized by loading the number of pixels N/4 of the areas of main scanning to the counter by $V_{sync}$ before image formation, counting $V_{clk}$, down-counting it, reloading N/4 and outputting a carry becoming n clocks to the up counter 83 at a point of time whereat up to N/4 has been counted, and increasing the output of the up counter 83 indicating the areas to thereby increase the output of the up counter 83 for N/4 pixels each. With regard also to the areas of sub scanning, as in the case of main scanning, $H_{sync}$ is counted by M/4 each to thereby produce an area signal for M/4 lines each and output it to the encoder 87. On the other hand, the image data is stored in the flip-flop 88 synchronously with $V_{clk}$ for the enable section of $H_{enable}$ and $V_{enable}$ by the AND gate 89. The output of the flip-flop 88 is inputted to one input of the adder 90. The data outputs of predetermined areas from the buffers 97, 98 and 99 of which the outputs are controlled by an encode signal indicative of each area are inputted to the other input of the adder 90. The too data are added together and the output thereof is stored in the flip-flop enable-controlled so as to correspond to a predetermined area, whereby the integrated values $C_{00}$–$C_{33}$ of the image data corresponding to the area indicated by the encoder 87 are stored in the respective flip-flops, and the density distribution read into the system controller 71 is estimated. Also, FIG. 6 shows the schematic timing of the signals of a video system, i.e., $V_{sync}$, $V_{enable}$, $H_{sync}$, $H_{enable}$, Data and C.

Figure 7:
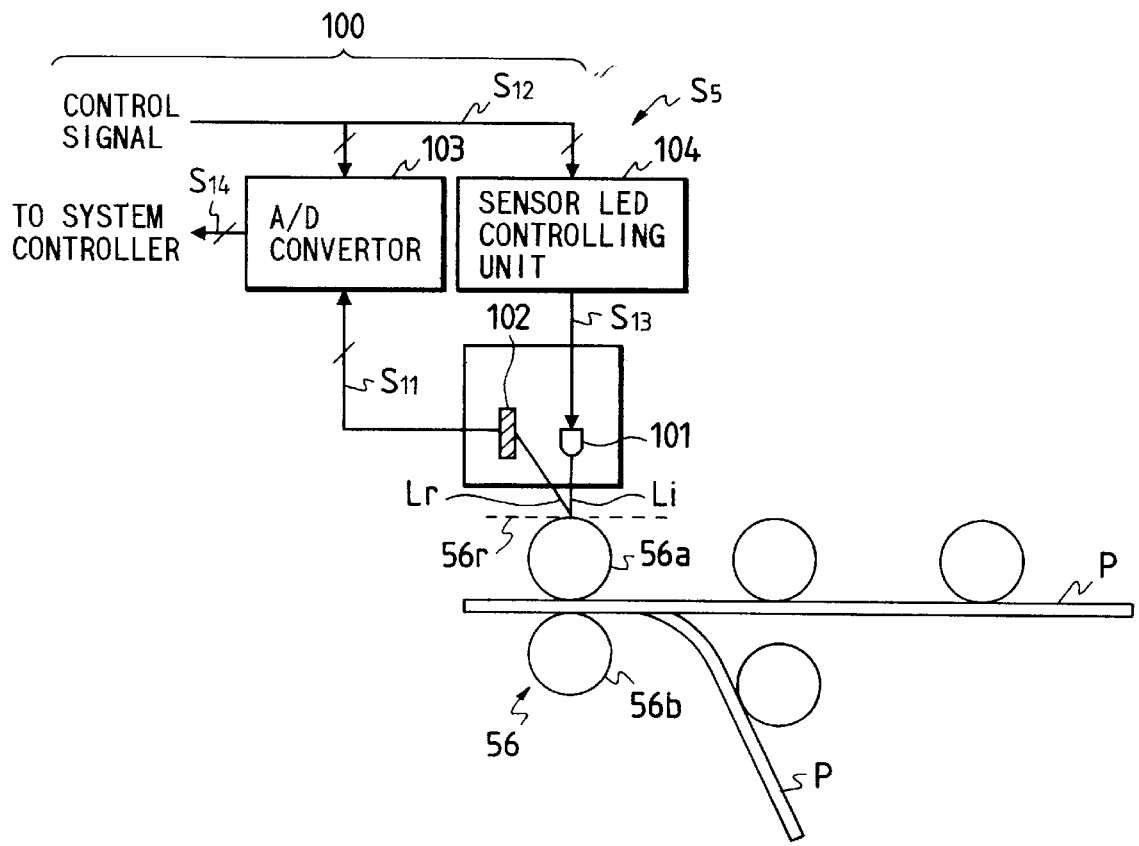
FIG. 7 shows the details of the construction of a paper thickness detecting unit.

The estimation of the image density distribution from the calculated image density data $C_{00}$–$C_{33}$ is effected by the calculation in the system controller 71. Next, FIG. 7 shows the paper thickness detecting unit $S_5$ used in the form of the present embodiment. The paper thickness detecting unit $S_5$ is provided with displacement amount detecting means 100 and a paper thickness detecting roller (thickness detecting roller) 56. This paper thickness detecting roller 56 is used also as the aforedescribed resist roller. Emitted light $L_i$ from the light emitting diode 101 of the displacement amount detecting means 100 is reflected by a reflecting surface $56_r$ which is the measuring surface of the upper roller 56a of the resist roller (paper thickness detecting roller) 56, and the reflected light $L_r$ enters a light receiving position sensor 102. The lower roller 56b of the resist roller 56 is fixed in a thrust direction and the upper roller 56a is installed in a free state and therefore, when the transfer member P is held between the upper and lower rollers 56a and 56b, the upper roller 56a is adapted to move in conformity with the thickness of the transfer member P. Thus, the reflecting surface $56_r$ moves correspondingly to the thickness of the transfer member P. The reflecting surface $56_r$ is adapted to move upwardly and toward the light emitting diode 101 when the transfer member P is thick, and to move downwardly and away from the light emitting diode 101 when the transfer member P is thin. As a result, the position of the reflected light entering the light receiving position sensor 102 charges in conformity with the thickness of the transfer member P, and is inputted to an A/D converter 103 as an analog signal $S_{11}$ which is the thickness signal of the transfer member P. The flicker and the quantity of light of the light emitting diode 101 are controlled by a control signal $S_{12}$ from the system controller 71 through a signal $S_{13}$ outputted from a sensor LED controlling unit 104. The control signal $S_{12}$ also controls the A/D conversion timing of the A/D converter 103, and a signal $S_{14}$ from the A/D converter 103 corresponding to the digitized thickness of the transfer member P is sent to the system controller 71, where the thickness of the transfer member P is calculated by a CPU.

Figure 8:
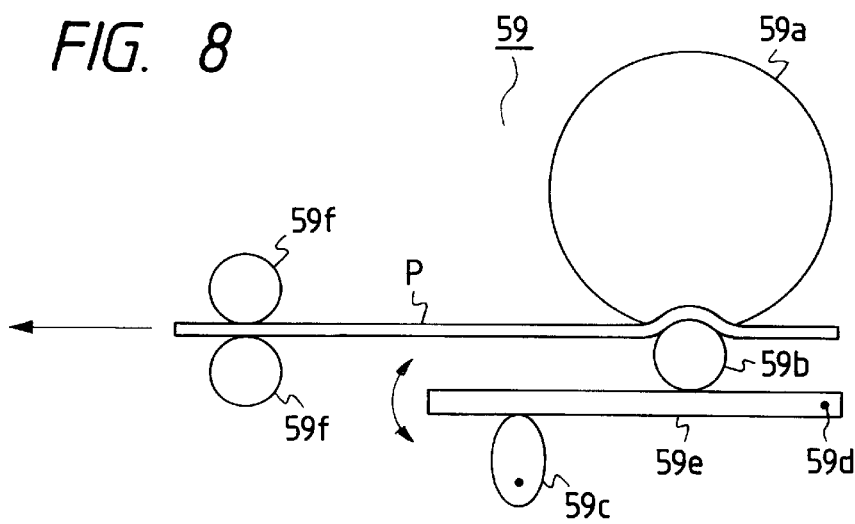
FIG. 8 shows the details of the construction of a pressing mechanism unit.

Next, FIG. 8 shows a detailed view of the pressing mechanism unit 59. Generally it is known that when a toner image transferred onto a transfer member P is heated and fixated, the transfer member P after the fixation becomes curled toward the toner image side. In such a state, the piling property on the paper discharge tray 61 is remarkably spoiled and at the same time, this may lead to the aggravation of the dischargeability of paper to a sorter (a post-treating apparatus) widely used in copying apparatuses, printer, etc., and further to jam or the like, and the control of the amount of curl after the fixation is a very important matter. In the form of the present embodiment, a method of controlling the amount of curl is realized by holding the transfer member P after fixation between a pair of sponge roller 59a and metallic roller 59b. Since a toner image is formed on the upper surface of the transfer member P, curling is suppressed by disposing the sponge roller 59a on the upper side and the metallic roller 59b on the lower side to apply curl in the opposite direction, and utilizing the fact that the metallic roller 59b eats into the sponge roller 59a. Also, the adjustment of the amount of pressure is controlled by driving a cam 59c to thereby move a metallic roller movable plate 59e pivotally movable about a shaft 59d up and down in the directions of arrows in FIG. 8. This amount of pressure is adjustable in a plurality of stages or without any stage in conformity with the shape of the cam 59c. The reference character 59f designates conveying rollers provided to make the conveyability of the transfer member P good. The adjustment of the amount of pressure by the cam 59c and metallic roller movable plate 59e of the pressing mechanism unit 59 is generically controlled by the CPU on the system controller 71 with reference to data such as the thickness of the transfer member P detected by the aforedescribed paper thickness detecting unit $S_5$ and the image density distribution estimated by the estimating circuit $S_6$.

Figures 9, 9A:
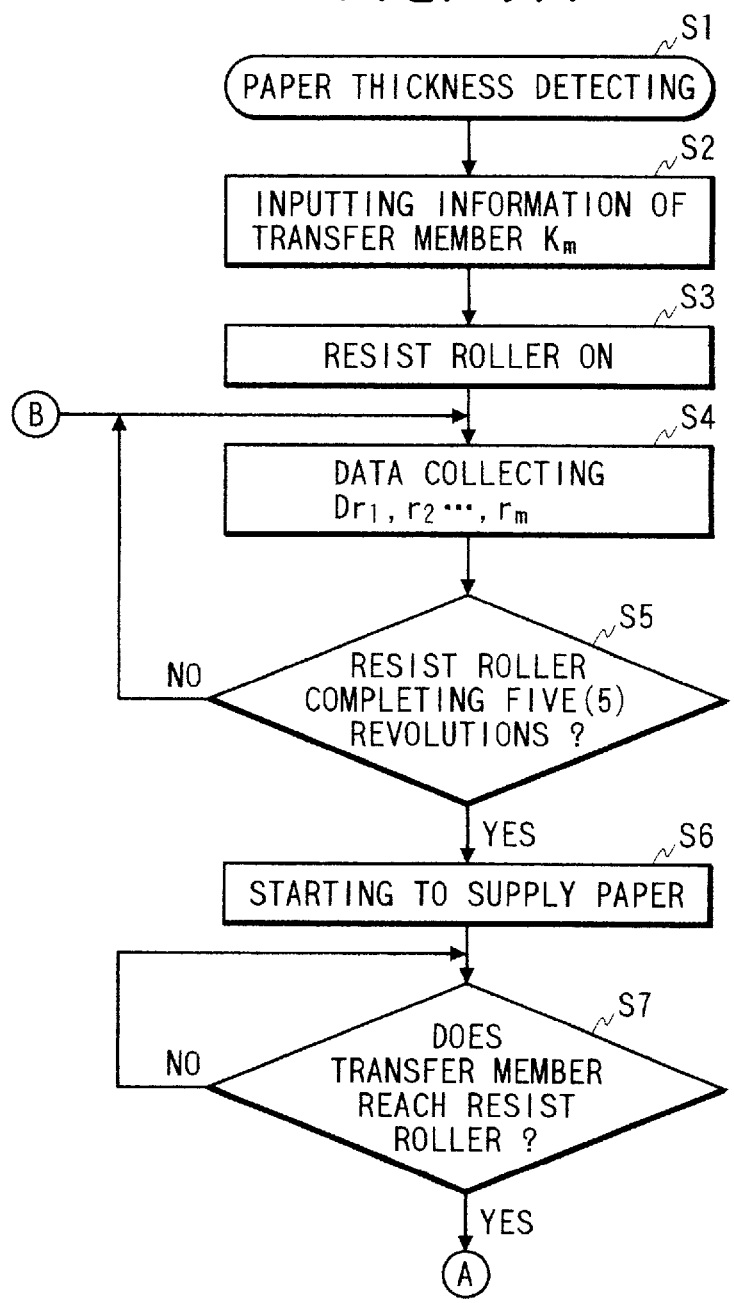
FIG. 9 which is composed of FIGS. 9A and 9B is a flow chart of detecting the thickness of the transfer member during continuous paper supply.
Figure 9B:
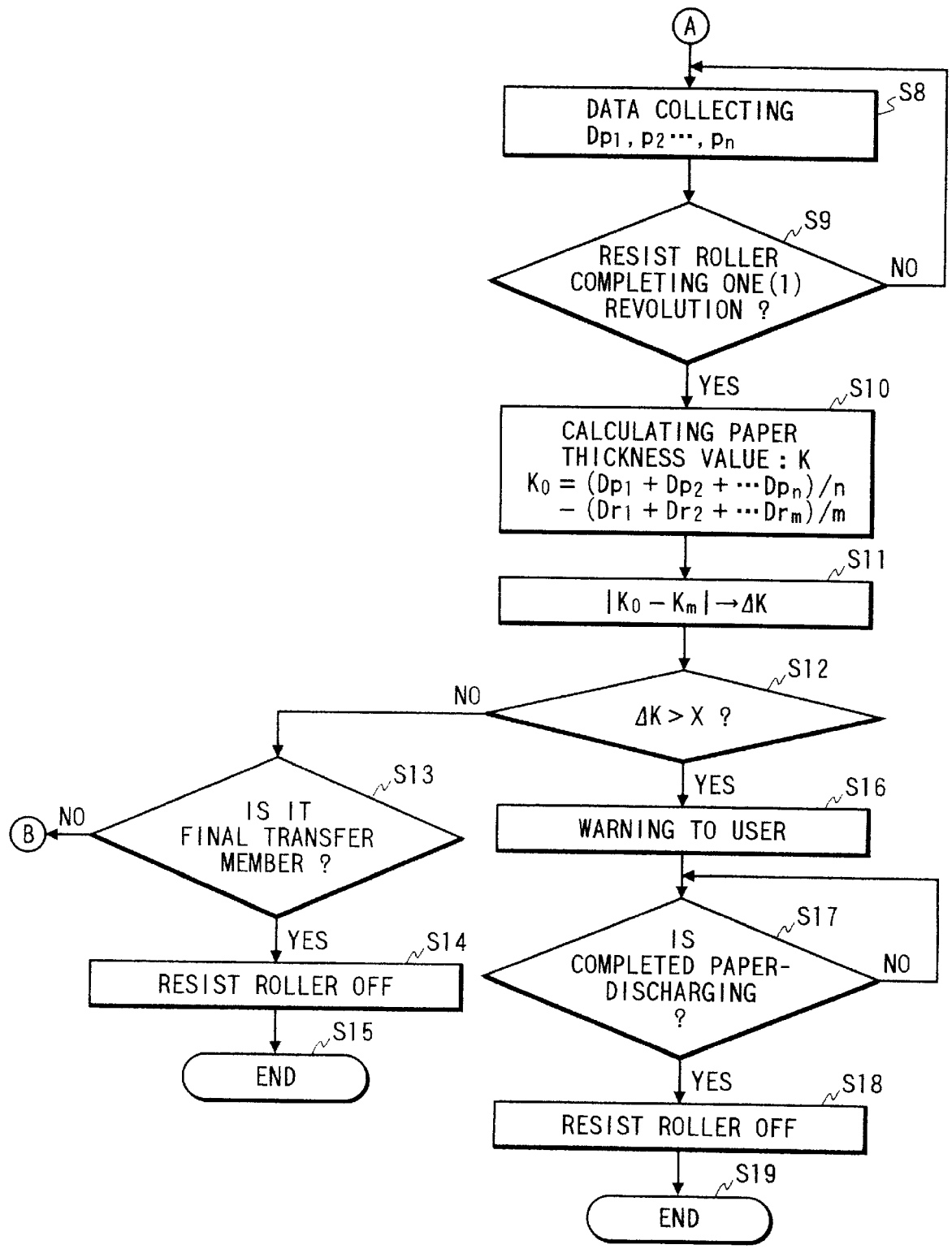

FIGS. 9A and 9B show a flow chart of a series of control about image forming condition control based on the information of the transfer member in the form of the present embodiment. The calculation of the thickness of the transfer member P is also generically controlled by the CPU on the system controller 71 (see FIG. 3). First, when the detection of the thickness of the transfer member P is effected (S1), data about the information of the transfer member is inputted from the operating portion (paper thickness designating unit S7) of the apparatus body 2 by the user (S2). As an inputting method, in order to mitigate the user's burden, the thickness of the transfer member P is not inputted as data, but for example, when the transfer member P is paper, there is adapted a method of selecting and inputting four stages, i.e., thin paper, ordinary paper, thick paper and super-thick paper. It is to be understood that thin paper is up to paper of basic weight 60 g, ordinary paper is up to paper of basic weight 100 g, thick paper is up to paper of basic weight 160 g and super-thick paper is paper of basic weight 200 g or greater. This is done by the user selecting a button corresponding to the transfer member on the basis of a manual. As described hitherto, the fixating conditions, the transfer conditions, etc. are controlled in conformity with these four stages, but when the information of the transfer member P inputted by the user differs greatly from the actual thickness of the transfer member P, bad images may happen. The flow of control for solving such an inconvenience will now be described with reference to the flow chart of FIGS. 9A and 9B.

The resist roller 56 is switched on to collect the data before the transfer member P arrives at the resist roller 56 (S3). The resist roller 56 serves also as the paper thickness detecting roller, as previously described. The thickness of the transfer member P, as previously described, is found by measuring the amount of displacement of the upper roller 56a of the resist roller 56 and therefore, it is necessary to collect first data in a state in which the resist roller 56 is not holding the transfer member P. The thickness of the transfer member P is derived from the difference between the first data when the resist roller 56 is not holding the transfer member P and second data when the resist roller 56 is holding the transfer member P and therefore, this first data when the resist roller 56 is not holding the transfer member P becomes a reference value when the thickness of the transfer member P is calculated. The collection of the first data ($D_{r1}$, $D_{r2}$, ..., $D_{rn}$) in the state before the resist roller 56 holds the transfer member P is started (S4). From the point of view that at a point of time relatively having a time margin before the paper supply in the form of the present embodiment is started, many data here are collected to thereby increase the reliability of the data, the data of five revolutions of the resist roller 56 are collected (S4 and S5). At a point of time whereat the resist roller 56 has made five revolutions, the collection of the first data in the state before the resist roller holds the transfer member P is stopped, and paper supply to the resist roller 56 is started (S6), and in the meantime, the collection of data is interrupted. When the transfer member P arrives at the resist roller 56 (S7), the collection of the second data ($D_{p1}$, $D_{p2}$, ..., $D_{pm}$) in the state in which the resist roller 56 holds the transfer member P is started (S8). The data collection here is the data collection in the state in which the resist roller 56 holds the transfer member P, and corresponds to one revolution of the resist roller 56 (S9). This is for not using data including the noise component of collision caused by the transfer member P arriving at the transfer belt 57 when transfer members P are successively conveyed from the resist roller 56. Therefore, the data corresponding to one revolution of the resist roller 56 are collected as a length equal to or smaller than the distance from the resist roller 56 to the transfer belt 57. The thickness $K_0$ of the first transfer member P is determined by the difference K between the average value of a first data collected at S4 to S5 in the state before the resist roller 56 holds the transfer member P and the average value of m second data collected at S8 to S9 in the state in which the resist roller 56 holds the transfer member P (S10). The difference $\Delta K$ between the thickness $K_0$ automatically detected by the paper thickness detecting unit $S_5$ and the thickness data $K_m$ based on the aforementioned user's manual inputting is found (S11). $K_m$ is a value determined correspondingly to each of the four stages, i.e., thin paper to super-thick paper.

At S11, an absolute value is assumed. This $\Delta K$ is compared with a predetermined value X (S12), and when not $\Delta K > X$, that is, when the difference between the thickness $K_m$ based on the manual inputting and the thickness $K_0$ by the automatic detection is not greater than the predetermined value, and when it is the final transfer member P (S13), the resist roller 56 is switched off (S14) and image formation is ended (S15). On the other hand, when it is not the final transfer member P, return is made to the collection of the first data of S4.

In contrast, when in the above-mentioned comparison between $\Delta K$ and X, $\Delta K > X$, that is, the difference between the thickness $K_m$ by the manual inputting and the thickness $K_0$ by the automatic detection is greater than the predetermined value, it is judged as wrong inputting or wrong detection, and this is warned to the user (S16). In this case, after the discharge of the transfer member P is completed (S17), the resist roller 56 is switched off, thus ending image formation (S19). If before image formation is started, for example, image formation on a plurality of transfer members P is designated and the above-described $\Delta K > X$ is obtained, the above-described steps S16 to S19 are taken, whereby image formation is effected only on the first transfer member P and the image formation sequence after that is stopped.

The thickness data $K_m$ is determined as the central value of ordinary paper in the kinds of paper manually inputted.

Also, the comparative value X is a value indicative of the latitude corresponding to a commercially available kind of paper, and even if actually the thickness differs by X, no problem will arise in a few frequency of image formation.

By thus providing the mechanism for manually inputting recording material information, and controlling the image forming conditions on the basis of this input value, it is possible to properly effect image formation on various recording materials equal in thickness but differing in unit weight.

Also, even when the operator commits an input error, the input error is judged by the output of the thickness sensor and the warring and the stoppage of the image forming operation are effected and therefore, the apparatus can be prevented from being damaged.

When manual inputting is not done, the image forming conditions are controlled on the basis of the detected value automatically detected by the paper thickness detecting unit.

While in the aforedescribed embodiment, description has been made of a case where the image forming apparatus is a color copying apparatus, the present invention can of course be applied also to an image forming apparatus such as a monochromatic copying apparatus. Again in the monochromatic apparatus, the control and selection of the transfer conditions or the fixating conditions by the difference in the kind, particularly the thickness of the transfer member P are great factors when highly accurate images are to be formed (particularly in the case of a digital copying apparatus), and this is a requisite technique when a more highly accurate quality of image will be required in the future.

In the above-described embodiment, the paper thickness detecting roller 56 is such that the lower roller 56b is fixedly disposed and the upper roller 56a is displaceably disposed, but alternatively, the two rollers 56a and 56b may be displaceably disposed and the distance between them may be detected to thereby detect the thickness of the transfer member P. In this case, however, it is necessary to change the construction of the displacement amount detecting means 100 in conformity with it.

Also, the paper thickness detecting roller 56 can be provided independently without being used also as the resist roller. In this case, the degree of freedom will increase with regard to the position at which the paper thickness detecting roller 56 is disposed.

Further, it is also possible as a matter of course to use other paper thickness detecting methods.

While the embodiments of the present invention have been described above, the present invention is not restricted to these embodiments, but all modifications within the technical idea of the present invention are possible.

What is claimed is:

1. An image forming apparatus comprising:

image forming means for forming an image on a recording member;

inputting means for manually inputting information regarding the recording member to the image forming apparatus;

control means for controlling image forming conditions on the basis of an input value by said inputting means;

detecting means for detecting a thickness of the recording member; and warning means for warning of an abnormality of the input to said inputting means on the basis of the input value by said inputting means and the detection value of said detecting means.

2. An image forming apparatus according to claim 1, wherein said image forming means has an image bearing member bearing a toner image thereon, a transfer charger for transferring the toner image on said image bearing member to the recording member, and a fixing device for fixing the toner image on the recording material, and said control means controls at least the transfer conditions of said transfer charger and the fixing conditions of said fixing device.

3. An image forming apparatus according to claim 2, wherein said control means controls at least a transfer electric field and a fixion speed.

4. An image forming apparatus according to claim 1, wherein when the inputting by said inputting means is not done, said control means controls the image forming conditions on the basis of the output of said detecting means.

5. An image forming apparatus according to claim 1, wherein inputting is done to said inputting means on the basis of the basic weight of the recording material.

6. An image forming apparatus according to claim 1, wherein when the difference between a value based on the input value by said inputting means and the detection value of said detecting means is equal to or greater than a predetermined value, said warning means warns of the abnormality of the input.

7. An image forming apparatus according to claim 1, further comprising stop means for stopping the image forming operation during the warning by said warning means.

8. An image forming apparatus according to claim 7, wherein said stop means stops image formation onto a recording member next to the recording member for which the abnormality of the input has been recognized.

9. An image forming apparatus comprising:

image forming means for forming an image on a recording member;

inputting means for manually inputting information regarding the recording member;

control means for controlling image forming conditions on the basis of the input value by said inputting means;

detecting means for detecting the thickness of the recording member; and stop means for stopping image formation on the basis of the input value by said inputting means and the detection value of said detecting means.

10. An image forming apparatus according to claim 9, wherein said image forming means has an image bearing member bearing a toner image thereon, a transfer charger for transferring the toner image on said image bearing member to the recording member, and a fixing device for fixing the toner image on the recording member, and said control means controls at least the transfer conditions of said transfer charger and the fixing conditions of said fixing device.

11. An image forming apparatus according to claim 10, wherein said control means controls at least a transfer electric field and a fixion speed.

12. An image forming apparatus according to claim 9, wherein when the inputting by said inputting means is not done, said control methods controls the image forming conditions on the basis of the output of said detecting means.

13. An image forming apparatus according to claim 9, wherein inputting is done to said inputting means on the basis of the basic weight of the recording material.

14. An image forming apparatus according to claim 9, wherein when the difference between a value based on the input value by said inputting means and the detection value of said detecting means is equal to or greater than a predetermined value, said stop means stops image formation.

15. An image forming apparatus according to claim 9, wherein said stop means stops image formation onto a recording member next to the first recording member for which abnormality has been recognized.

* * * * *

UNITED STATES PATENT AND TRADEMARK OFFICE
CERTIFICATE OF CORRECTION

PATENT NO. : 5,831,744
DATED : November 3, 1998
INVENTOR(S) : TATSUHITO KATAOKA

It is certified that error appears in the above-identified patent and that said Letters Patent is hereby corrected as shown below:

COLUMN 1,
Line 63, "yet" should be deleted.

COLUMN 2,
Line 34, "chart of" should read --chart for--.

COLUMN 4,
Line 44, "fixion" should read --fixing--.

COLUMN 8,
Line 33, "a such" should read --such a--.

COLUMN 10,
Line 31, "control" should read --controls--.

COLUMN 12,
Line 8, "few" should read --new--.

COLUMN 13,
Line 16, "fixion" should read --fixing--.

UNITED STATES PATENT AND TRADEMARK OFFICE
CERTIFICATE OF CORRECTION

PATENT NO. : 5,831,744
DATED : November 3, 1998
INVENTOR(S) : TATSUHITO KATAOKA

It is certified that error appears in the above-identified patent and that said Letters Patent is hereby corrected as shown below:

COLUMN 14,
Line 20, "fixion" should read --fixing--; and
Line 23, "methods" should read --means--.

Signed and Sealed this

Third Day of August, 1999

Q. TODD DICKINSON

Attest:

Attesting Officer

Acting Commissioner of Patents and Trademarks